Patented Aug. 7, 1951

2,563,650

UNITED STATES PATENT OFFICE 2,563,650

METHOD OF HARDENING BAUXITE WITH COLLOIDAL SILICA

Heinz Heinemann, Drexel Hill, Pa., assignor to Porocel Corporation, Philadelphia, Pa., a corporation of Delaware No Drawing. Application April 26, 1949,
Serial No. 89,815

11 Claims. (Cl. 252—455)

The present invention relates to a method of hardening bauxite granules for use in the treatment of petroleum and its products, and particularly in the refining and decolorization of hydrocarbon oils.

A further object of this invention is the production of hardened bauxite granules suitable as such for the thermal conversion of hydrocarbons, and also suitable as carriers or supporting agents for a variety of catalysts including metals, metal oxides, and metal salts.

The hardness of bauxite granules, i. e., their resistance to abrasion, compression, and friction, is of considerable importance in commercial installations in which bauxite is disposed in towers or columns for contact with fluids. While such granules have a certain natural hardness or a hardness imparted by conventional thermal activation, it is desirable in most cases where operating conditions are severe, to further strengthen them. Such increase in strength or hardness should be accomplished in a manner which does not materially change the physical characteristics of the granules, viz., their porous nature and high surface area, and which does not introduce chemical constituents detrimental to the various uses to which the bauxite may be put.

I have found that it is possible to increase the hardness of bauxite granules of desired size which have been thermally activated by heating at 600° F. to 1200° F. to reduce the volatile matter content (mostly water) to a value between 1% and 10%, by soaking the granules in or wetting them with a colloidal solution of silica in which the silica has a particle size between 100 and 600 angstrom units (Å.). The bauxite granules have an average pore diameter between 50 and 100 Å., and it is desirable to deposit the silica particles only in bauxite pores of largest diameter, i. e., those along which cleavage would most naturally occur. It is here emphasized that the purpose of this invention is to fill up the largest pores of the bauxite, which will offer the first line of cleavage and mechanical disintegration under operating conditions, without filling the bulk of the medium and small pores which present most of the available surface area for contacting purposes. The silica in the colloidal solution here used has an average particle size of 100 to 600 Å., large enough not to enter the bulk of the pores, but small enough to fill the largest pores. Such colloidal solution is neither a true solution of silica nor is it a solution of alkali metal silicate. While the method of preparing the colloidal silica solution forms no part of this invention, it may be stated that ion exchanging an alkali metal silicate solution will produce the requisite colloidal silica. To obtain the most economic use of the colloidal silica solution, it is preferred to use a solution of such concentration and amount that when it is mixed with the bauxite granules, there will remain little or no excess solution, i. e., the solution is substantially completely adsorbed. However, if desired, the bauxite granules may be soaked in an excess of the colloidal silica solution, and the excess thereafter drained off. The quantity of silica incorporated in the bauxite should be between 1% and 8% by weight, and the concentration and amount of colloidal silica solution are regulated accordingly. The concentration of colloidal silica in the aqueous solution employed is preferably between 8% and 30%. Since activated bauxite granules, regardless of mesh size, will not adsorb more than 8% of colloidal silica, and since less than about 1% of silica will not produce appreciable hardening of the bauxite granules, the quantity and concentration of the colloidal silica solution are so controlled as to give between 1% and 8% silica in the bauxite without leaving much or any excess or drainable amount of solution after the mixing of the bauxite and solution is completed. A commercially available colloidal silica solution "Ludox" which may be used has the following properties:

| | |
|---|---:|
| SiO$_2$ per cent | 29–31 |
| Na$_2$O do | 0.31–0.41 |
| Sulfates (as Na$_2$SO$_4$) do | 0.15 |
| pH | 9.5–10.5 |
| Gravity °Baumé | 24.7–26.4 |
| Viscosity @ 25° C. | 2.0–3.3 |
| Freezing point °F | 32 |
| SiO$_2$ (average particle size) Angstroms | 100–600 |

Such colloidal silica solution may be diluted with water without affecting its stability. Cooling the solution to 32° F. or lower causes the silica to be irreversibly precipitated. The alkali present and reported above as Na$_2$O is merely for stabilizing purposes and does not represent silicate.

The mixing of the thermally activated granular bauxite with the colloidal silica solution may be carried out in conventional mixing apparatus, such as a vessel provided with rabble arms and means for distributing the silica solution over the granules, for example, one or more spray nozzles. After the mixing has been completed, the bauxite granules containing adsorbed silica solution are then subjected to any one of several treatments for causing precipitation of the silica in the granules.

The simplest and most economic method for precipitating the silica in the granules is by heating or drying the granules at temperatures between 180° F. and 220° F., although somewhat higher temperatures may be used, if desired, for example, up to about 400° F. After the silica has been irreversibly precipitated in the pores of the bauxite granules, such granules may be washed with water to remove sodium ions derived from the stabilizing alkali, or with aqueous solutions of ammonium salts and then with water, following which the granules are dried and calcined at 600° F. to 1200° F. Alternatively, the washing may be omitted when the presence of sodium ions is not detrimental to the subsequent use of the bauxite.

A second method of accomplishing the precipitation of the silica in the bauxite is by adding a solution of an electrolyte such as ammonium chloride, and then washing, drying, and calcining at 600° F. to 1200° F. Other electrolytes such as alkali metal chlorides or sulfates, calcium or magnesium chlorides, or chlorides of aluminum or zinc may be used, the electrolyte preferably being removed by washing prior to drying and calcination.

A third method of precipitating the silica in the bauxite is to either increase the pH of the adsorbed colloidal silica solution above 9.5–10.5 by adding an alkali solution, or to decrease the pH by adding an acid, for example, hydrochloric acid or sulfuric acid, and after precipitation is complete, washing out the alkali or acid, and then drying and calcining.

A fourth method of effecting precipitation of the silica is by cooling the bauxite granules containing the adsorbed colloidal silica solution to a temperature of 32° F. or lower and thus destroying the colloidal state by freezing. After freezing, the granules may be heated to dryness and then calcined, or the granules may be washed, dried, and calcined.

When it is desired to employ the hardened bauxite granules as a support or carrier for catalysts such as metals, metal oxides, metal sulfides, or metal salts, the bauxite granules, after precipitation of silica therein, may be dried to remove adsorbed free moisture and then impregnated with the desired catalyst. If desired, water washing may precede the drying. Alternatively, the bauxite granules containing the precipitated silica may be dried or calcined, or washed, dried, and calcined, prior to incorporation of the catalyst.

The present invention may be further illustrated by the following examples, which, however, are not to be construed as limiting the scope thereof.

Natural bauxite ore was dried, crushed, screened to 2/4 mesh, and portions of the 2/4 mesh granules were separately heated at 220° F., 750° F., and 1100° F., respectively, prior to incorporating the colloidal silica. The various portions, after cooling, were mixed with sufficient colloidal silica solution (18% concentration SiO$_2$, pH 10, average particle size of SiO$_2$ 100 to 600 Å.) to incorporate 7.75% silica in the granules. The silica was precipitated in the bauxite granules either by drying at 180° F.–220° F. or by adding sufficient sodium hydroxide (concentrated solution) to increase the pH to a value above 10.5. In some cases, the granules were water washed after the precipitation of the silica, and in all cases the hardened granules were finally heated or calcined at various temperatures. To determine the hardness or resistance to break-down, the finally calcined granules (2/4 mesh) were tumbled in a metal cylinder 10 inches in length and 4 inches in diameter rotated at 19 R. P. M. for one hour, and then screened to determine the amount of breakdown. The results are presented in the following table, and the notations "per cent T/4, per cent T/8, per cent T/20" define the percentage of bauxite passing through a 4 mesh screen, an 8 mesh screen, and a 20 mesh screen, respectively. The smaller the percentages, the less the break-down of the granules.

| Initial Calcin. Temp. of Bauxite, °F. | Per Cent SiO$_2$ added | Method of Pptn. | Water Wash | Calcination, °F. | Hardness | | |
|---|---|---|---|---|---|---|---|
| | | | | | Per Cent T/4 | Per Cent T/8 | Per Cent T/20 |
| 750 | none | | | | 12.2 | 6.5 | 3.5 |
| 220 | (1) | drying | no | 750 | 16.0 | 8.7 | 4.0 |
| 220 | (1) | do | no | 1,100 | 14.6 | 7.8 | 3.7 |
| 750 | 7.75 | do | no | 750 | 3.7 | 1.6 | 1.4 |
| 750 | 7.75 | do | yes | 750 | 1.9 | 1.3 | 1.1 |
| 1,100 | none | | | | 11.8 | 6.3 | 3.2 |
| 1,100 | 7.75 | drying | no | 1,100 | 2.2 | 1.4 | 1.2 |
| 1,100 | 7.75 | do | yes | 1,100 | 1.8 | 1.2 | 0.8 |
| 1,100 | 7.75 | NaOH | no | 1,100 | 2.9 | 1.8 | 1.3 |
| 1,100 | 7.75 | drying | no | 220 | 3.4 | 1.3 | 0.7 |
| 1,100 | 7.75 | do | yes | 220 | 2.0 | 1.1 | 0.8 |

[1] Soaked in 16% solution.

From the above, it will be evident that washing of the impregnated granules and final calcination at high temperature (1100° F.) is superior to non-washing and/or calcination at low temperature. Granules which have initially been calcined at 1100° F. prior to impregnation with silica are more effectively hardened than those which have simply been dried (220° F.) or initially calcined at 750° F. before impregnation.

The variation in hardness of 2/4 mesh bauxite with the amount of silica incorporated is shown in the following table.

| Initial Calcin. Temp. of Bauxite, °F. | Per Cent SiO$_2$ added | Method of Pptn. | Water Wash | Calcination, °F. | Hardness | | |
|---|---|---|---|---|---|---|---|
| | | | | | Per Cent T/4 | Per Cent T/8 | Per Cent T/20 |
| 1,100 | none | | | | 11.8 | 6.3 | 3.2 |
| 1,100 | 7.75 | drying | yes | 1,100 | 1.2 | 0.8 | 0.8 |
| 1,100 | 4.20 | do | yes | 1,100 | 2.1 | 1.2 | 0.9 |
| 1,100 | 1.95 | do | yes | 1,100 | 3.0 | 1.4 | 0.8 |
| 1,100 | 0.80 | do | yes | 1,100 | 7.0 | 3.4 | 1.7 |
| 1,100 | 0.40 | do | yes | 1,100 | 10.0 | 6.2 | 3.4 |

In the following table, it is shown that the surface area (square meters per gram) of the silica-hardened 2/4 mesh bauxite is not substantially diminished, and in fact, may be increased by the hardening treatment.

| Initial Calcin. Temp. of Bauxite, °F. | Per Cent SiO₂ added | Method of Pptn. | Water Wash | Calcination, °F. | Surface Area, m.²/g. |
|---|---|---|---|---|---|
| 1,100 | none | | | | 90 |
| 1,100 | 7.75 | drying | no | 1,100 | 87 |
| 1,100 | 7.75 | do | yes | 1,100 | 86 |
| 1,100 | 7.75 | do | yes | 220 | 88 |
| 750 | none | | | | 150 |
| 750 | 7.75 | drying | no | 750 | 154 |
| 750 | 7.75 | do | yes | 750 | 166 |

Impregnation of various mesh sizes of thermally activated bauxite with colloidal silica shows that the hardening effect is obtained irrespective of mesh size. Bauxite ore was dried, crushed, and screened to give samples of 2/4 mesh, 4/8 mesh, and 20/60 mesh, and each of the samples was then calcined at 1100° F. A portion of each sample was mixed with a sufficient quantity of 18% concentration colloidal silica solution to give 8% silica in the bauxite. The silica was precipitated by heating at 180° F.–220° F., and the bauxite granules were water washed, dried, and calcined at 1100° F. Both the silica-hardened samples and the unhardened samples were then tested for hardness by the tumbling and screening method described hereinbefore. In the following table, the results of the tests upon the various mesh sizes are given, "A" representing the unhardened bauxite, and "B" representing the silica-hardened bauxite.

| Hardness | 2/4 mesh | | 4/8 mesh | | 20/60 mesh | |
|---|---|---|---|---|---|---|
| | A | B | A | B | A | B |
| Per Cent T/4 | 9.2 | 2.2 | | | | |
| Per Cent T/8 | 6.3 | 0.9 | 26.4 | 9.6 | | |
| Per Cent T/14 | | | 10.0 | 3.2 | | |
| Per Cent T/20 | 3.6 | 0.7 | | | | |
| Per Cent T/42 | | | 3.6 | 2.4 | | |
| Per Cent T/60 | | | | | 14.8 | 5.8 |

In another aspect of the present invention, I have found that bauxite granules hardened in accordance with my invention are highly advantageous for use as catalyst carriers or supports, since such hardened granules not only possess a high degree of mechanical strength, but also appear to enhance the activity of the catalyst incorporated therein. Various samples were made up and tested for hardness by the test hereinbefore described, the sample preparation and results being given below.

(1) Bauxite ore, as mined, was dried to about 30% volatile matter content (mostly water) and ground and screened to 8/14 mesh, and thereafter calcined at 1100° F. to 2% volatile content.

(2) A portion of the bauxite prepared as in (1) was mixed with sufficient colloidal silica solution of 18% concentration to give 8% by weight of silica in the bauxite, and the mixing was continued until substantially all of the solution was adsorbed. The bauxite containing the colloidal silica was then heated at 220° F. to irreversibly precipitate the silica in the bauxite granules and to remove moisture, and calcined at 1100° F.

(3) A 1000 gram portion of the calcined bauxite granules as produced in (1) was impregnated with a solution consisting of 181.5 grams of $Cr_2O_3$, 24.6 grams of $KNO_3$, and sufficient water to make 500 cc. The solution and the bauxite were mixed for 30 minutes, then dried slowly and finally heated at 1000° F. for 4 hours. Thereafter the catalyst was reduced with hydrogen at 900° F. prior to use.

(4) A 1000 gram portion of the silica-hardened bauxite granules prepared as in (2) was impregnated with $Cr_2O_3$ and reduced in hydrogen in exactly the same manner as in (3).

(5) A 1000 gram portion of the calcined bauxite granules as produced in (1) was impregnated with a solution consisting of 828 grams of $MoO_3$, 931 cc. of concentrated ammonium hydroxide, and 1960 cc. of water. The bauxite and impregnating solution were mixed for 30 minutes, then dried and heated at 750° F. for 2 hours. The catalyst was then reduced in hydrogen at 900° F. prior to use.

(6) A 1000 gram portion of the silica-hardened bauxite granules prepared as in (2) was impregnated with $MoO_3$ and reduced in hydrogen in the same manner as in (5).

Each of the above samples was tested for hardness by the method hereinbefore described, and samples 3, 4, 5, and 6 were tested for catalytic activity in the reforming of naphtha. Samples 1 and 2 were not subjected to the latter test, since it is commonly known that bauxite is inefficient as a reforming catalyst.

The method of evaluating the catalysts is as follows: 100 grams of catalyst granules were charged to a steel reactor tube equipped with a preheating section. The temperature of the tube and catalyst was raised to 950° F. by means of external electric resistance heaters, the catalyst was then purged with air for 15 minutes, nitrogen for 5 minutes, and hydrogen for 5 minutes. The pressure in the tube was then raised to 100 lbs./sq. in., hydrogen being charged at the rate of 53 liters per hour, and the short boiling range naphthenic naphtha was passed through the catalyst bed at 950° F. at a liquid space velocity of 1 volume of naphtha per volume of catalyst per hour. At the conclusion of the 4 hour test period, the naphtha charge was shut off, but hydrogen was allowed to pass through the reactor for an additional 15 minutes. The products of the reforming operation were collected and examined for aromatic hydrocarbon content.

The results of the hardness and reforming tests are given in the following table.

| Sample | Hardness | | | Catalytic Activity Per Cent Aromatics formed |
|---|---|---|---|---|
| | Per Cent T/8 | Per Cent T/14 | Per Cent T/42 | |
| 1 | 26.4 | 10.0 | 3.6 | |
| 2 | 9.6 | 3.6 | 2.4 | |
| 3 | 14.4 | 5.4 | 2.4 | 38.3 |
| 4 | 7.0 | 1.9 | 0.5 | 36.9 |
| 5 | 18.0 | 6.4 | 2.4 | 29.6 |
| 6 | 8.8 | 2.2 | 1.0 | 30.9 |

From the above data it will be seen that the catalysts using silica-hardened bauxite as a support or carrier showed substantially greater hardness or less breakdown than those using unhardened bauxite, and that the catalytic efficiency was substantially unimpaired by the presence of the silica.

Another aspect of the present invention is the heat resistance of the hardened bauxite-containing catalyst, particularly bauxite-nickel catalyst. Hardened and unhardened bauxite-nickel catalyst were prepared as follows, and tested for hardness after exposure to heating at 1800° F. for various periods.

(7) Bauxite, as mined, was dried to about 30% volatile matter content (mostly water), and ground and screened to 2/4 mesh, and thereafter calcined at 1100° F. to 2% volatile content.

(8) A portion of the bauxite prepared as in (7) was mixed with sufficient colloidal silica solution of 16% concentration to give 7.75% by weight of silica in the bauxite, and the mixing was continued until substantially all of the solution was adsorbed. The bauxite containing the colloidal silica was then heated at 220° F. to irreversibly precipitate the silica in the bauxite granules and to remove moisture, and calcined at 1100° F.

(9) A 1000 gram portion of the calcined bauxite granules as produced in (7) was impregnated with a melt of 800 grams of $Ni(NO_3)_2 \cdot 6H_2O$. The material was mixed at 180° F.–200° F. for 30 minutes, then dried and heated to 750° F. until the nickel nitrate is completely decomposed to the oxide. This procedure may be repeated to give an additional amount of nickel oxide on the bauxite. The catalyst was then reduced with hydrogen at 900° F. to give metallic nickel on the bauxite, prior to use.

(10) A 1000 gram portion of the silica-hardened bauxite granules prepared as in (8) was impregnated with nickel in exactly the same manner as in (9).

The results of the hardness test are given in the following table.

| Time at 1800° F. hours | Hardness of 2/4 mesh bauxite+20% nickel | | | | | |
|---|---|---|---|---|---|---|
| | Bauxite+Ni (9) | | | Silica-hardened Bauxite+Ni (10) | | |
| | Per Cent T/4 | Per Cent T/8 | Per Cent T/20 | Per Cent T/4 | Per Cent T/8 | Per Cent T/20 |
| 2 | 16.8 | 6.9 | 3.8 | 11.2 | 3.7 | 1.2 |
| 24 | 24.7 | 12.6 | 6.7 | 12.6 | 5.4 | 2.0 |
| 96 | 63.2 | 31.2 | 17.1 | 9.4 | 4.2 | 1.4 |
| 168 | ----- | ----- | ----- | 10.5 | 4.8 | 1.5 |

From the above it will be evident that the silica-hardened bauxite carrying the nickel was substantially more resistant to attrition after heating at high temperature than the unhardened bauxite-nickel catalyst.

When it is desired to harden the bauxite with colloidal silica solution and effect precipitation of the silica by the addition of chemical agents, it appears that somewhat better results are obtained by adding the precipitating agent to the colloidal silica solution before same is added to the bauxite rather than after the colloidal silica is added to the bauxite. The results are shown in the treatment of 4/8 mesh bauxite calcined at 1100° F., using an 18% concentration of colloidal silica solution in an amount sufficient to give 8% by weight of silica in the bauxite. The hardness tests are shown in the following table.

| Pptn. Agent | Pptn. Time, hours | Pptn. Agent added to Colloidal Silica Solution | | | | | |
|---|---|---|---|---|---|---|---|
| | | Before Bauxite | | | After Bauxite | | |
| | | Per Cent T/8 | Per Cent T/14 | Per Cent T/42 | Per Cent T/8 | Per Cent T/14 | Per Cent T/42 |
| $H_2SO_4$ | 42 | 7.2 | 2.6 | 1.2 | 9.6 | 1.6 | 0.8 |
| $NH_4Cl$ | 1 | 8.2 | 3.4 | 1.6 | 14.4 | 3.6 | 1.0 |
| Drying 220° F | | 9.6 | 3.6 | 2.4 | 9.6 | 3.6 | 2.4 |

The silica-hardened bauxites of the present invention may be used not only as catalysts or catalyst supports, but also for decolorizing and refining oils, fats, and waxes, sugar solutions, and for dehumidifying gases or vapors, and for dehydrating a variety of fluids such as hydrocarbons, alcohols, ethers, esters, ketones, and the like.

For example, in determining the efficiency of unhardened and silica-hardened bauxite for dehumidifying air, the following test was employed. Air at 75% relative humidity at 80° F. was passed through beds of the desiccants to determine the dry gas capacity, which is the weight percent moisture removed from the air and retained by the desiccants at the point where the desiccants begin to pass air containing moisture.

Bauxite ore was dried, ground and screened to 8/14 mesh, and calcined at 750° F. to a volatile content of 8.9% (water of hydration). A portion of this material, upon testing, had a dry gas capacity of 7.5 weight percent, and had a surface area of 150 square meters per gram.

The remainder of the calcined bauxite was impregnated with sufficient 16% colloidal silica solution to give 8% silica in the bauxite. The material was dried to effect precipitation of the silica in the bauxite granules and to remove moisture. Upon testing, the silica-hardened bauxite had a dry gas capacity of 7.3 weight percent, and had a surface area of 154 square meters per gram.

The catalysts produced in accordance with the present invention may be employed in the catalytic desulfurization of petroleum fractions, or in the processing of hydrocarbons involving hydrogenation, dehydrogenation, aromatization, reforming, cracking, polymerization, isomerization, or in the Fischer-Tropsch conversion of carbon monoxide and hydrogen. The impregnated catalysts may comprise silica-hardened bauxite containing from about 0.1% to 20% of various metals, oxides, sulfides, or salts, particularly those of titanium, vanadium, chromium, manganese, iron, cobalt, nickel, copper, zinc, zirconium, molybdenum, palladium, silver, cadmium, tungsten, platinum, gold, mercury, thorium, and uranium, or mixture of two or more thereof.

I claim:

1. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, and precipitating the silica in the granules.

2. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, precipitating the silica in the granules, and calcining the granules at 600° F. to 1200° F.

3. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, precipitating the silica in the granules, washing the granules with water, and calcining the granules at 600° F. to 1200° F.

4. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, and precipitating the silica in the granules by drying at temperatures in the range of 180–400° F.

5. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, and precipitating the silica in the granules by adding an electrolyte salt.

6. A method for hardening thermally activated bauxite granules having an average pore diameter between 50 and 100 Å. without substantially reducing the surface area of said granules, which comprises treating said granules with a colloidal solution of silica of an average particle size between 100 and 600 Å. having a pH between 9.5 and 10.5 in an amount sufficient to give between 1% and 8% of silica in the bauxite granules, and precipitating the silica in the granules by changing the pH to a value outside the range 9.5 to 10.5

7. Thermally activated bauxite granules having an average pore diameter between 50 and 100 Å. surface hardened with 1% to 8% of silica derived from a colloidal solution of silica of an average particle size between 100 and 600 Å.

8. A catalyst comprising thermally activated bauxite granules having an average pore diameter between 50 and 100 Å. surface hardened with 1% to 8% of silica derived from a colloidal solution of silica of an average particle size between 100 and 600 Å., and impregnated with 0.1 to 20% a solid catalyst selected from the group consisting of metals, their oxides and sulfides.

9. A catalyst comprising thermally activated bauxite granules having an average pore diameter between 50 and 100 Å. surface hardened with 1% to 8% of silica derived from a colloidal solution of silica of an average particle size between 100 and 600 Å., and impregnated with 0.1 to 20% molybdenum oxide.

10. A catalyst comprising thermally activated bauxite granules having an average pore diameter between 50 and 100 Å. surface hardened with 1% to 8% of silica derived from a colloidal solution of silica of an average particle size between 100 and 600 Å., and impregnated with 0.1 to 20% chromium oxide.

11. A catalyst comprising thermally activated bauxite granules having an average pore diameter between 50 and 100 Å. surface hardened with 1% to 8% of silica derived from a colloidal solution of silica of an average particle size between 100 and 600 Å., and impregnated with 0.1 to 20% nickel.

HEINZ HEINEMANN.

REFERENCES CITED

The following references are of record in the file of this patent:

UNITED STATES PATENTS

| Number | Name | Date |
|---|---|---|
| 2,080,359 | Lepsoe et al. | May 11, 1937 |
| 2,154,079 | Weiss | Apr. 11, 1939 |
| 2,292,632 | Greger | Aug. 11, 1942 |
| 2,383,653 | Kirk | Aug. 28, 1945 |
| 2,391,116 | Ashley | Dec. 18, 1945 |
| 2,394,515 | Goshorn | Feb. 5, 1946 |
| 2,407,247 | Briggs | Sept. 10, 1946 |
| 2,454,942 | Pierce et al. | Nov. 30, 1948 |
| 2,464,205 | Bates | Mar. 15, 1949 |